N. STAFFORD.
CALCULATING MACHINE.
APPLICATION FILED JUNE 14, 1911.

1,026,473.

Patented May 14, 1912.

WITNESSES

INVENTOR
Nelson Stafford
BY
ATTORNEYS

N. STAFFORD.
CALCULATING MACHINE.
APPLICATION FILED JUNE 14, 1911.

1,026,473.

Patented May 14, 1912.
8 SHEETS—SHEET 8.

WITNESSES

INVENTOR
Nelson Stafford
BY
ATTORNEYS

UNITED STATES PATENT OFFICE.

NELSON STAFFORD, OF NEW YORK, N. Y.

CALCULATING-MACHINE.

1,026,473.  Specification of Letters Patent.   Patented May 14, 1912.

Application filed June 14, 1911. Serial No. 633,015.

*To all whom it may concern:*

Be it known that I, NELSON STAFFORD, a citizen of the United States, and a resident of the city of New York, borough of Brooklyn, in the county of Kings and State of New York, have invented a new and Improved Calculating-Machine, of which the following is a full, clear, and exact description.

Among the principal objects which the present invention has in view are: to provide a machine of the character named wherein are imprinted in column form a succession of numbers, and wherein may be imprinted at will the totals of column sections, or the result of a succession of such totals; to provide means for exposing to view at will the composited number designed for addition to the column and the number indicating the total of the column inclusive of the number composed for addition thereto; and to popularize machines of this character by simplifying and economizing the construction and cost.

One embodiment of the present invention is disclosed in the structure illustrated in the accompanying drawings, in which like characters of reference denote corresponding parts in all the views, and in which—

Fig. 3 is a vertical cross section taken on the line 3—3 in Fig. 1.

The instrumentalities conjoined to form the present machine are naturally grouped to constitute individualized mechanisms, which, for the purpose of simplification in the following description are set forth in their correlated order, and the mechanisms are treated as units in the completed machine, having for that purpose assigned to them arbitrarily certain distinctive names. Thus, by the term "adding mechanism" will be understood a certain series of coordinately arranged type wheels the periphery of the wheels being provided with type characters set out from the said wheels, and a corresponding series of selective operating mechanisms for setting the said wheels in printing position, and a resetting mechanism for the said wheels operable at the termination of the transfer of each number to a listing paper. By the term "totalizing mechanism" will be understood a second series of type provided wheels coördinately arranged and connected with the adding mechanism by means of transmission mechanism adapted to effect a progressive movement only in the said wheels of the totalizing mechanism. By the term "resetting mechanism" will be understood two groups of instrumentalities operatively connected with reference to the adding mechanism and the totalizing mechanism; and arranged for manual manipulation selectively and independently to reset to zero the members of each series of wheels. By the term "printing and feeding mechanisms" will be understood groups of instrumentalities for imprinting in column order characters on a record sheet corresponding to the type set out from the face of the wheels in composited order, each of said groups of instrumentalities being provided with manually selective and operative means. To distinguish the individual members of each group the designating numeral provided therefor is in turn identified by a grouped arrangement: thus, the designating numerals assigned to the elements of the first named group, the adding mechanism, will fall within the 100 denomination; the second group within the 200 denomination, and so on.

Figure 1:
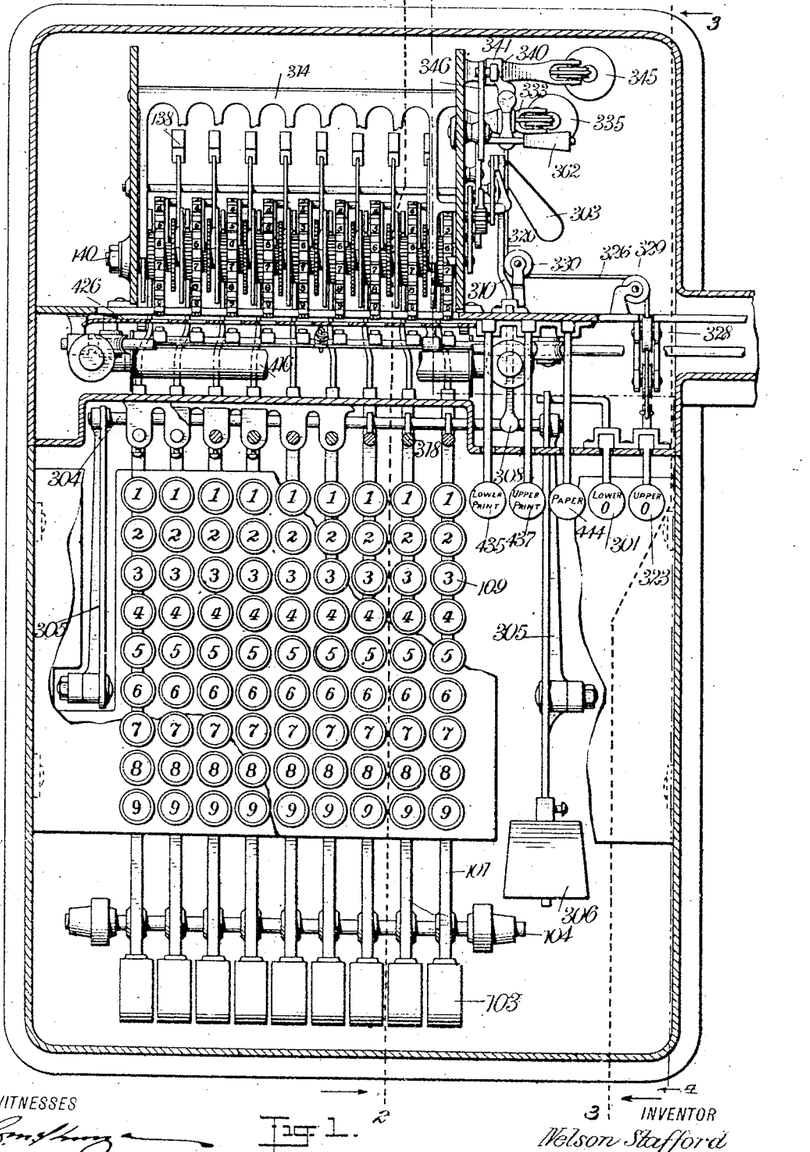
Figure 1 is a horizontal section of a machine constructed and arranged in accordance with the present invention, the section being taken on the lines 1—1 in Figs. 2 and 3.

*The adding mechanism.*—In the present mechanism there is employed a series of type setting bars. The number of bars corresponds to the total number of the characters to be used in the printing columns. Normally the bars 101 are disposed in the position shown in Fig. 2 of the drawings, the free end being lifted against the guard 102 by the weight 103 with which each of the bars is provided. Each bar is loosely pivoted on a shaft 104 which shaft is fixedly mounted in standards 105 disposed as shown in Fig. 1 on the base plate 106. Disposed in line with and directly above each of the bars 101 is a series of plungers 107. The plungers 107 are extended through perforations formed in the inclined table 108, and are provided thereabove with the heads 109. The heads 109 are equipped with numerals ranging from one to nine successively.

Each of the plungers 107 is slidably mounted in guiding perforations formed in the plates 110. The plungers are each provided with a pin 111 extended through the plunger to form a seat for the upper end of each of the coiled springs 112. The coiled springs 112 are extended about to enfold the plungers 107, and are employed to lift the said plungers to the normal position disclosed in Fig. 12. When the plungers are depressed the springs 112 yield to permit this movement. The extent to which the plungers are depressed is preferably unified, and this by providing each of the plungers with a fixed pin 113 adapted for impingement upon the upper plate 110 as a block to prevent the further downward movement of the depressed plunger. In this manner there is secured for each of the plungers an accurate similarity in the extent of the movement of the plunger. Where the plunger extends below the lower plate 110 it is provided with a presser foot 114. It is designed that the extension of the lower ends of the plunger 107 be such that relatively the foot 114 assumes an arrangement in a line substantially parallel to the upper surface of the bar 101.

It is designed that in the normal uplifted position of the plungers 107 the feet 114 shall rest in contact with the bar 101. The accuracy of adjustment requires an interposed member between each of the plungers and the bar 101, and this is furnished by a series of set pins 115, as seen in the drawings. One such pin 115 is provided for each plunger. The pins 115 are preferably provided with a screw thread to register with the threads of the perforations formed in the bar 101, for which purpose the body of the said bar is increased to form a turret 116. By this arrangement the pins 115 may be manipulated to secure great delicacy in the adjustment of the particular plunger to the bar 101.

In spacing the plungers 107 each from the other care is exercised that the resultant movement of the bar 101 be proportioned in accurate and equal gradations from the first and successively to the last of the plungers 107. That is, if the free end of the bar 101 is depressed from the normal at rest position a certain distance, it will be moved twice the distance by the depression of the plunger which is second of the series, and three times the distance by the depression of the plunger which is third of the series, and so on.

Figures 4, 17:
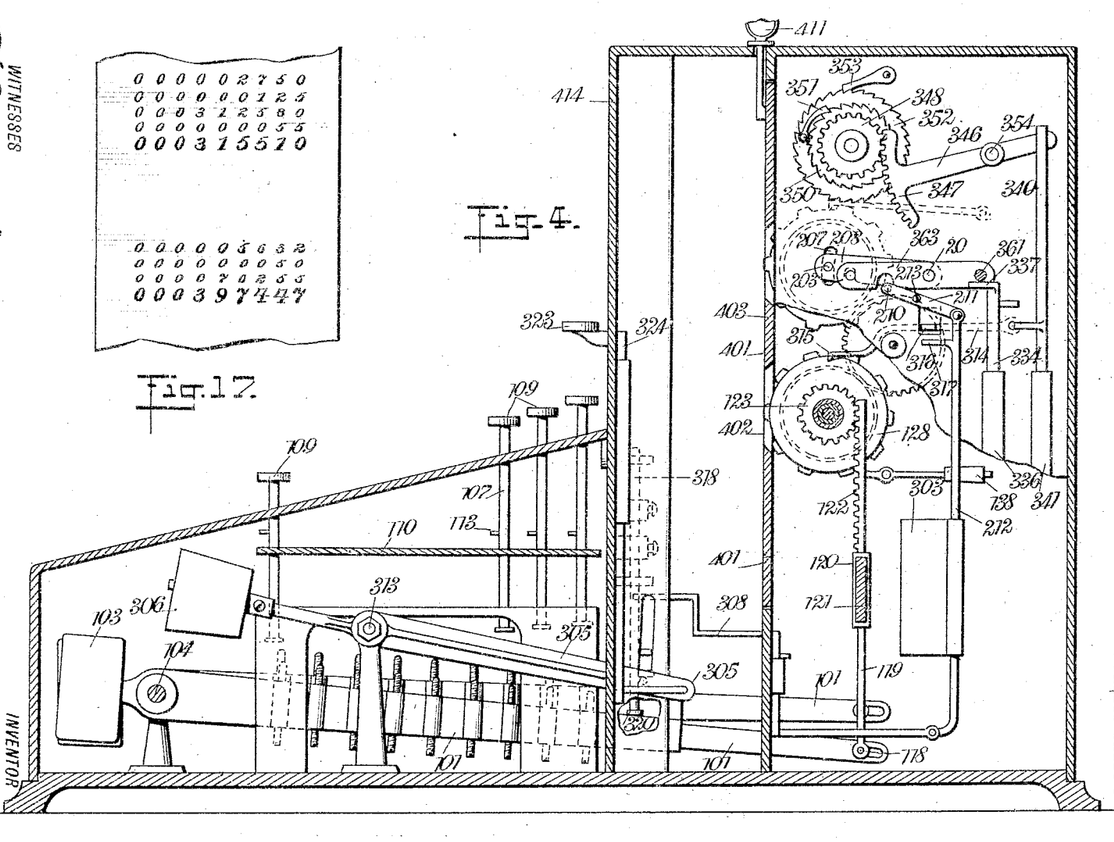
Fig. 4 is a vertical cross section taken on the line 4—4 in Fig. 1.
Fig. 17 is a detail view showing a fragment of the paper ribbon formed by the operation of a calculating machine constructed in accordance with the present invention.

At the free end of each bar 101 is formed a slot 117 through which is extended the shank of a connecting screw 118. Each screw 118 is set out from the side of a rack bar 119, which bar is slidably mounted in a turret 120 formed in the guide bar 121. This construction is best seen in Fig. 4 of the drawings. The rack bars 119 are provided with a straight toothed section 122, the teeth whereof on each bar are meshed with the teeth of a gear wheel 123, which gear wheel 123 is fixedly connected with a type wheel 124. The type wheels 124 are equal in number to the bars 101, each bar being independently and operatively connected with each type wheel. The extent of the operation of each type wheel, as above indicated, is dependent upon the selection of the plunger 107 which is depressed. The type carrying bosses 125 with which each wheel is provided range in numerals from one to nine and an added naught, or ten such bosses to each wheel. The extent of the depression of the bar 101 lessens as the point of impingement of the plungers 107 is removed from the shaft 104. Thus the plunger farthest removed from the shaft 104 is provided with the designating character 125 "1." The depression of this plunger operates to depress the free end of the bar 101 to move the wheel 124 one type space, or if the wheel be previously set at naught the wheel will be moved to advance in printing position the numeral "1." If the fourth plunger which bears the designating numeral "4" be now depressed the wheel 124 will be moved to present the boss 125 bearing the printing numeral "4," and so on. When each of the plungers 107 is released it is lifted by the spring 112 and the weight 103 at the outer end of the bar 101 which has been depressed with the said plunger.

Figure 9:
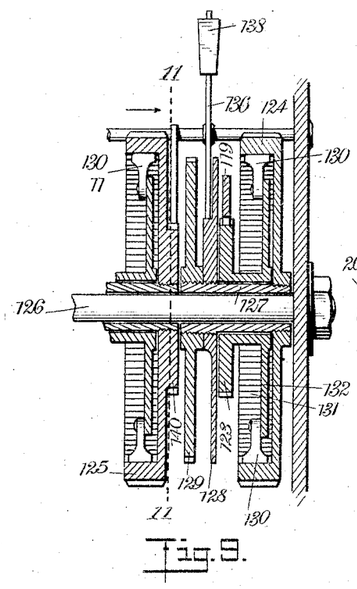
Fig. 9 is a detail view, on an enlarged scale and in cross section, of two juxtaposed type wheels.

The wheels 124 are each rotatively mounted upon a shaft 126. For this purpose each wheel is provided with a sleeve 127 which forms a bearing for the said wheel. The wheel is fixedly attached to the sleeve 127, as is also the disk 128 and the transmission wheel 129. The wheel 124, as best seen in Fig. 9 of the drawings, is dished and is provided at the inner side of the rim flange with ratchet teeth to receive the free end of the pawls 130. The pawls 130 are preferably weighted to engage the teeth 131 formed on the inner side of the rim of the wheel 124. The pawls, if desired, may be spring actuated. The pawls are pivotally mounted on a disk 132 which is directly connected with the gear wheel 123, with the teeth of which are meshed the teeth of the rack bar 119. The pawls 130 are so set that as the rack bars 119 are lowered the said pawls engage the teeth 131 of the wheel 124 and advance the wheel in conformity with the movement of the rack bar 119 and the type setting bars 101. When the controlling plunger 107 is released and the type setting bar 101 and the bar 119 are lifted by the action of the spring 112 and the weight 103, the pawls 130 override the teeth 131, permitting the wheel 124 to remain in the set position. The disk 128 is provided to form an advancing transmission mechanism between the adjacent type wheels whereby, as in a comptometer, the complete rotation of one wheel registers by the movement in the progressive manner the next adjacent wheel denoting a higher arithmetical denomination.

Figures 2, 11, 12:
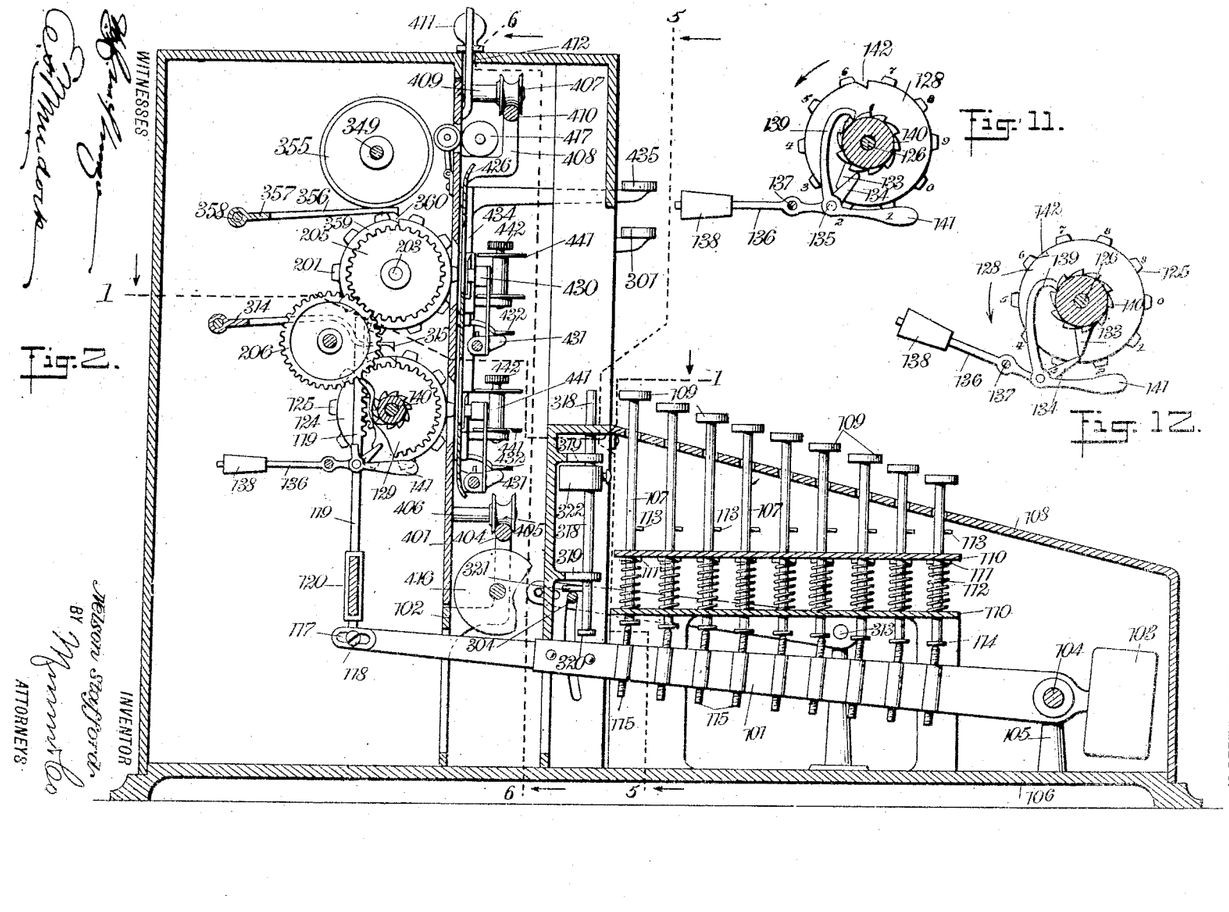
Fig. 2 is a vertical cross section taken on the line 2—2 in Fig. 1.
Figs. 11 and 12 are detail views, showing in side elevation the type wheels disposed in the successive printing arrangement, together with the mechanism for feeding the said wheels.

As seen in Fig. 11 of the drawings there is projected from the side of each disk 128 an offset 133. Extended into the path of the offset 133 is an arm 134 of the rocking lever 136. The lever 136 is mounted on a shaft 137 and is provided at the free end with a weight 138. In the operation of the disk 128, moving in unison with the wheel 124, the offset 133 impinges upon and deflects the arm 134, riding thereover, when the weight 138 reinstates the arm 134 in its normal position, as shown in said Fig. 11. The depression of the arm 134 and the portion of the lever from which the said arm is extended operates to draw downward the pawl 139 which is rotatively mounted on a short extension pin 135. The pin 135 is extended from the side of the lever 136 toward the ratchet wheel 140, fixedly secured upon or integrally formed with the wheel 124 having the printing characters of the next succeeding arithmetical denomination. Each of the pawls 139 is rotated to engage the teeth of the ratchet wheel 140 by means of the weighted arm 141 with which it is provided. Thus it will be seen that as the wheel 124 makes a complete revolution it causes a movement in the next adjacent wheel having printing characters of the next higher denomination, a movement equal to one of the character printing spaces. In other words, a complete revolution of the wheel disposed in the unit column will inaugurate a movement resulting in the adjustment of the wheel in the tens column indicating one space advance of the said ten wheels. A complete revolution of the wheel disposed in the tens column results in a space movement of the wheel disposed in the hundreds column, and so on.

*The totalizing mechanism.*—With the mechanism constructed and arranged as so far described the operation of mechanically adding a column may be performed. It is thought unnecessary to describe the operation, as it is to all intents and purposes the same as employed in the usual adding machines. As in the said adding machines the operation of the keys ultimates in placing in printing position the numbers on the various wheels, which is the resultant or the total of the additions of the various columns. In the art as at present disclosed this resultant or total is printed, and the mechanism is then returned to the zero or naught position. In the present invention this resultant is duplicated on a second set of wheels, and if desired is retained after the first set of wheels is returned to the zero or initial position. This operation on the part of the present machine permits its employment as a "listing" or adding machine.

Figure 10:
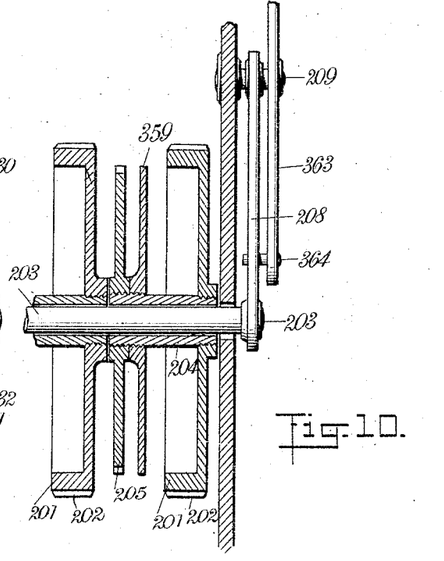
Fig. 10 is a view similar to Fig. 9, showing the upper or totalizing type wheels.

The second set of wheels above referred to is shown best in Fig. 10 of the drawings, and there designated by the numeral 201. The peripheries of the wheels 201 are provided with a boss 202 having formed thereon the printing characters indicating numerals similar in form and arrangement to those carried on the first or lower set of wheels. The wheels 201 are rotatively mounted on the shaft 203, each wheel being provided with and rigidly attached to a sleeve 204. The sleeve 204 is provided with a gear wheel 205 which is also rigidly mounted upon the said sleeve.

The wheels 201 are rotated by the wheels 124 and by the said wheels only, there being no independent setting mechanism for the said wheels 201. The transmission between each wheel 201 and its corresponding wheel 124 is provided by a wheel 206 which is meshed with the wheels 129 on the lower set and the wheels 205 on the upper set of type printing wheels. When in the course of operation the wheels 124 are reset or returned to their initial position it is to avoid the resetting of the upper set, or wheels 201, that they are lifted from engagement with the lower set, or wheels 205 are removed from engagement with the transmission wheels 206.

It is to permit the separation between the wheels 205 and 206 that the shaft 203 is mounted in the guide slot 207, shown best in Fig. 4 of the drawings. The shaft 203 is pivotally mounted in levers 208 disposed at each end of the said shaft, which levers are pivotally connected at 209. The levers 208 normally rest upon the pins 210 set out from the ends of short levers 211. The levers 211 are pivotally connected with the link rods 212. The levers 211 are pivoted at 213. When in the course of operation the link rods 212 are drawn downward the levers 211 are rocked to lift the shaft 203 to separate or disengage the wheel 205 from the transmission wheel 206, as seen in Fig. 4 of the drawings. When the operation of the levers 211 is reversed, as shown in Fig. 3 of the drawings, the shaft 203 is lowered to permit the enmeshment of the wheels 205 and 206. To elevate the shaft 203 in the manner mentioned is required when the lower set of wheels or the upper set of wheels is to be reset to the zero or initial position. During the operation of the adding or listing and the totalizing mechanisms, and the totalization of the same for the purpose of forming a printed record, it is not found necessary to operatively separate the wheels 124 and 201.

In the usual course of operation of the machine when employing the totalizing mechanism just above described the paper record is lifted from the printing station opposite the set of wheels 124 to the printing station opposite the set of wheels 201. For this purpose the feeding mechanism hereinafter described is employed. Further, it will be understood that in the usual course of operation, after the total has been imprinted on the paper record, the paper is torn from the roll and removed from the machine.

It will be understood that in the operation of adding, the wheels 124 are manipulated to set up the type characters carried thereby to designate the sum of the added columns. This sum may be viewed directly from the front of the machine, or may be printed upon a paper record, or both, as hereinafter set forth. If desired, in this operation of adding columns the record may be produced by printing each total of each column after each printing or lower set of wheels is reset to the zero or initial position. Each print on the lower set would give the successive totals of successively added columns. The upper set of wheels not being reset a continuous total of the successive columns could be carried so that at the end of the operation of adding successive columns a grand total would be found to have been set up for view or record on the upper set of wheels.

If the machine be used for what is known in the banking business as listing, where there are printed in successive order the amounts of the checks paid, the lower set of wheels 124 is employed for the purpose of recording the successive amounts of the checks, and the wheels are reset to the initial position after each imprint of the machine of each check, but the wheels 201 not being reset an accumulated total is being constantly composed upon the said wheels 201. Thus, by employing the present machine the column total at any point in the operation, may be visually disclosed, or recorded, by consulting, or printing with, the upper set of wheels 201. At any stage of the operation it will be understood that the upper set of wheels 201 may also be reset, either to correspond with the lower set of wheels or independent thereof.

*The resetting mechanism.*—For the purpose of description the resetting mechanism is divided into two separate groups, the mechanism for operating the resetting of the lower set of wheels 124 being operably distinctive from the operation of the upper set of wheels 201. Therefore there will be first described the mechanism for operating the lower set of wheels.

The key pad 301 is provided with a plunger 302. It is by depressing the pad 301 that the operation of the machine is inaugurated whereby the upper set of wheels 201 is first disengaged from the lower set of wheels 124, and subsequent to such disengagement the lower set of wheels is rotated forward to the zero or initial position and there arrested. The first portion of this operation effects the disengagement of the wheels 205 with the wheels 206. For this purpose the lever 211 is disposed in the position shown in Fig. 4 of the drawings. The link rod 212 has mounted thereon an overbalancing weight 303. The weight 303 is normally supported by a cross bar 304 to dispose the lever 211 in the position shown in Fig. 3 of the drawings. The cross bar 304 is extended between the free ends of balancing arms 305, at the outer ends whereof is mounted an overbalancing weight 306. The weight 306 is sufficient to maintain in raised position the arms 305 and cross bar 304 against the upper end of a slot 307, shown in Fig. 5 of the drawings. The weight 306 primarily sustains the weight 303, being operatively connected therewith by a bracket 308 which overlies the cross bar 304 and is extended through a partition wall of the machine and guidably mounted in a loop 309. The bracket 308 is fixedly connected with an extension 310 which is pivotally connected at 311 with the rod 212. The lower end of the plunger 302 is provided with a pin 312 which pivotally engages the forward end of one of the arms 305. When the key pad 301 is depressed by the operator the arms 305 are rocked on their pivots 313, lowering the cross bar 304 and the bracket 308 supported thereby. The effect of this is to permit the weight 303 to pull on one side of the lever 211 to raise the other side thereof against the lever 208 to lift the upper set of type wheels and the wheels 205 thereof from engagement with the transmission wheels 206. Simultaneous with the lift of the lever 208 the trigger plate 314 is permitted to settle so that the detents 315 each rest upon one of the disks 128 with which each of the wheels 124 is fixedly connected. Each of the disks 128 is provided, as shown in Figs. 11 and 12, with a nick 142. In the subsequent rotation of the wheels 124 and disks 128 the wheels follow the direction shown by arrow in Fig. 11, and the nick 142 on each wheel passes into engagement with the detent 315 of the plate 314.

Normally the plate 314 is elevated so that the detents 315 are lifted from engagement with the nicks 142. For this purpose the plate 314 is provided with an extension 316 under which is extended the bracket 317. The bracket 317 is integrally formed with the link rod 212. Hence, at the initiation of the descent of the rod 212, being impelled thereto by the weight 303, the plate 314 is permitted to rock its pivot to present the detents in operative position to arrest the wheels 124 at the zero station.

The wheels 124 and disks 128 by which the same are arrested, are rotated by depressing the rack bars 119, to accommodate the independent and various setting of the type wheels and the varied extent of rotation in the same proportion as made to independently depress each of the type setting bars 101 connected with each of the said wheels. For this purpose a series of resetting plungers 318 is provided. Each plunger 318 is superposed in line with a type setting bar 101, and is mounted in perforations formed in a bracket 319, as seen best in Fig. 2 of the drawings. The plungers 318 are provided with a foot pad 320 to impinge upon the type setting bars 101 when permitted. Normally the plungers 318 and foot pads 320 thereof are suspended above the type setting bars 101 by means of a pin 321 with which each plunger is provided. Each pin rests upon and is separated by the cross bar 304, as is shown best in Fig. 5 of the drawings. Each plunger 318 is provided with a weight 322 adjustably mounted thereon, which weight is sufficient, when the bar 304 is removed as a support of the plunger, to depress the same upon the type setting bars 101 to overbalance the weight 103 thereon, and to depress the various rack bars 119 to rotate the wheels until each is separately arrested by the nick 142 of the disk 128 engaging the detent 315 to which it is assigned. Thus it will be seen that when the operator depresses the key pad 301 the wheels 201 are disengaged from the wheels 124, the trigger plate 314 is dropped into position to engage the nicks 142 of the disks 128, and the wheels 124 are each independently rotated forwardly and arrested in the initial or zero position. When, after the operation of resetting the lower set of wheels 124 the key pad 301 is released, the weight 306 lifts the said key pad, the bracket 308, the rod 212 and weight 303 carried thereon to rock the lever 211 to lower the lever 208 and shaft 203 carried thereby, permitting the reëngagement of the wheels 205 and 206. Although the wheels 124 have, by this operation, been reset to the zero or initial position, it will be remarked that the wheels 201 remain in the position to which they were advanced prior to the initiation of the resetting operation. The further manipulation of the key pads to compose the wheels 124 for further operation results in a duplicate or added advance of the wheels 201, thereby increasing the total presented by the said wheels 201.

To effect the restoration of the wheels 201 to the initial or zero position the operator depresses the key pad 323. The pad 323 is connected with the plunger 324. In Fig. 3 of the drawings the plunger 324 is shown in part, being broken away to disclose the plunger 302 and parts connected therewith. The lower end of the plunger 324 is provided with a pin 325 to which is rigidly attached a flexible cable 326. The cable 326 is reeved over the pulleys 327, 328, 329, 330 and 331, and is attached to the lower end of a plunger 334. The pulley 332 is mounted on the end of a bracket 333 extended from the lower end of a tube 336.

The plunger 334 is slidably mounted in the tube 336. At the upper end of the plunger it is provided with a bracket 337 to limit the upward throw thereof. Extended from the opposite side of the plunger 334 is a pad 338 disposed in the path of a pad 339 extended from the side of the second plunger 340. The plunger 340 is slidably mounted in a tube 341. The tube 341 is provided at the lower end with a pulley 342 over which is passed the cable 343 to suspend the plunger 340 at the lower end thereof. The plunger 334 is lifted by a weight 335, said weight being suspended by the cable 344 which is reeved over the pulley 332 and connected to the lower end of the plunger 334. This construction is best seen in Fig. 3 of the drawings where the cable 344 is shown as broken away to expose the cable 326 in line therewith and behind the cable 344. The lower end of the plunger 340 extends below the tube 341 and has attached thereto the free end of the cable 343. At the opposite end of the cable 343 is attached the weight 345.

Pivotally connected at the upper end of the plunger 340 is a rocking lever 346. At the outer end of the lever 346 is provided a segment 347. The teeth of the segment 347 are meshed with the gear wheel 348. The gear wheel 348 is rotatively mounted on the shaft 349, and has fixedly connected therewith a ratchet wheel 350. The teeth of the ratchet wheel 350 are pitched, as shown in Fig. 3, in a forward direction to engage the pawl 351 pivotally mounted on a second ratchet wheel 352. The wheel 352 is fixedly mounted on the shaft 349, and is provided with teeth pitched in the reverse direction to those provided for the teeth of the wheel 350 to engage the pawl 353 which is pivotally mounted on the frame of the machine.

Figure 7:
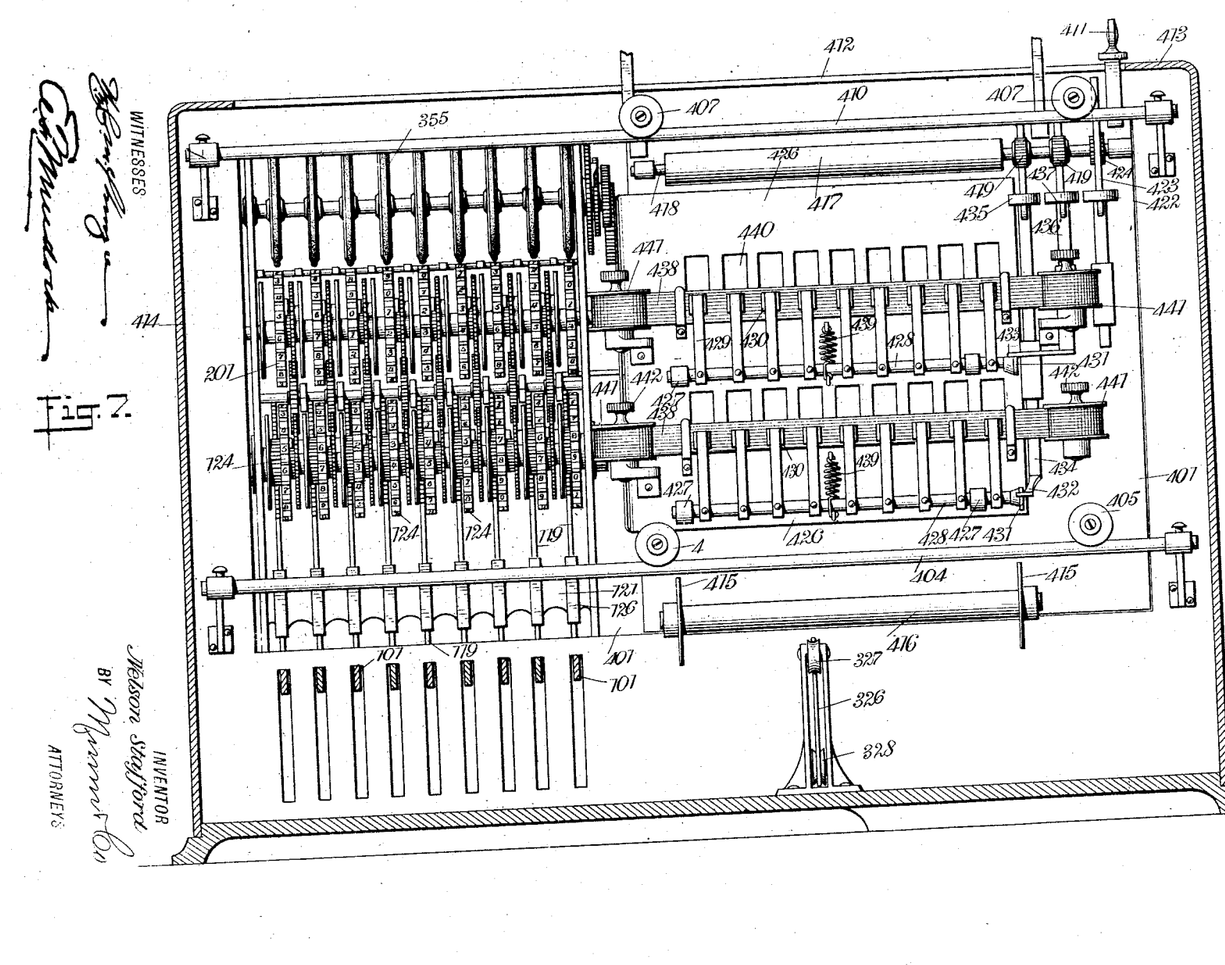
Fig. 7 is a vertical longitudinal section taken on the line 6—6 in Fig. 2, showing the paper carrier and printing devices moved to expose the tabulating wheels.
Figure 8:
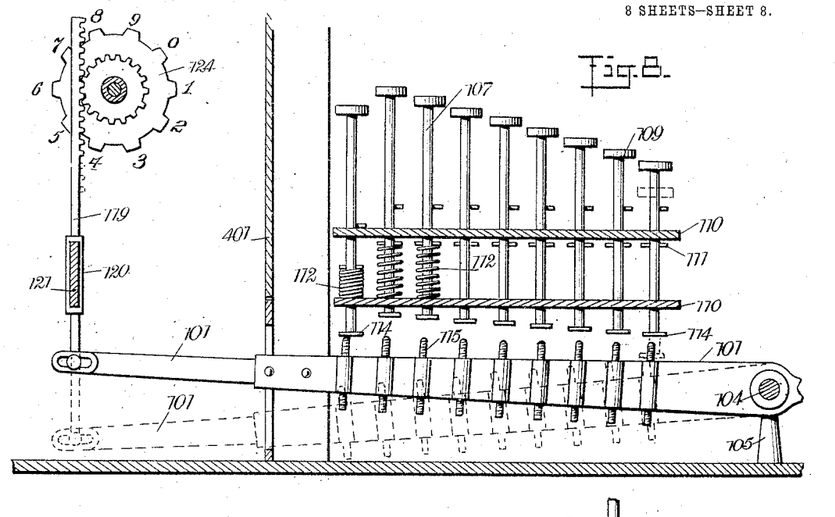
Fig. 8 is a detail view in vertical cross section showing the operating keys and type setting mechanism connected therewith.

As seen best in Figs. 2 and 7 of the drawings the shaft 349 is provided with a series of friction disks 355, one such disk being provided for each of the wheels 201 and disposed in line therewith. When in the course of operation the levers 208 are lifted the peripheries of the wheels 201 impinge upon the peripheries of the disks 355 to be rotated thereby for resetting the said wheels to the zero point. The frictional engagement thus provided allows for slippage of certain of the disks on the top wheels 201 if the same be arrested by the detents 356.

The detents 356 are extended from the trigger plate 357 which is fixedly mounted on a shaft 358, best seen in Fig. 2 of the drawings. The disks 359 are each provided with a nick 360 adapted to receive the toothed end of the detent 356. The operation, arrangement and construction of the detents 356 resemble to all intents and purposes that of the detents 315. It will be noted that the fixed disposition of the plate 357 and detents 356 is such that the disks 359 are lifted into contactual relation with the said detents.

To lift the shaft 203 and the wheels 201 the lever 363 is rocked on the pivot 209. For this purpose the lever 363 is provided with an arm 361 at the outer end whereof is provided a weight 362. To engage the lever 208 and to lift the same the lever 363 is provided with a fin 364. The interlocking arrangement thus provided is best seen in Fig. 3 of the drawings.

The operation of the resetting mechanism for the upper set of wheels 201 is as follows:

The operator by depressing the key pad 323 and the plunger 324 connected therewith draws upon the cable 326 and thereby draws downward the plunger 334. The plunger 334 being removed from under the arm 361 permits the weight 362 to rock the lever 363 to lift the shaft 203 and the wheels 201 mounted thereon. The lift of the wheels thus imparted is sufficient to force the top bearing peripheries thereof against the disks 355 and the friction faces thereof. By reason of the separation between the pad 338 and 339 an amount of lost motion is permitted between the plungers 334 and 340 whereby the wheels 201 are moved against the disks 355 before the said pads are brought in contact. From this point on the depression of the plunger 334, which continues, depresses the plunger 340 and the outer end of the lever 346. The rocking of the lever 346 on the shaft 354 rotates the wheel 348 and the ratchet wheel 350 connected therewith. As above explained, the result of the rotation in the forward direction of the ratchet wheel 350 rotates the disks 355. The rotation of the disks 355 is such as to cause a complete revolution of the wheels 201. After the resetting has been accomplished the operator releasing the key pad 323, the weights 335 and 345 operate to return the wheels 201 to their normal position, lifting the end of the lever 363 carrying the weight 362 and depresses the segment 347 of the lever 346, the ratchet wheel 350 rotating backward under the pawl 351. To prevent the movement backward of the disk 355 the pawl 353 engages the teeth of the ratchet wheel 352, which ratchet wheel is fixedly and operatively connected with the said disks 355.

*The printing and feeding mechanisms.*

Figure 6:
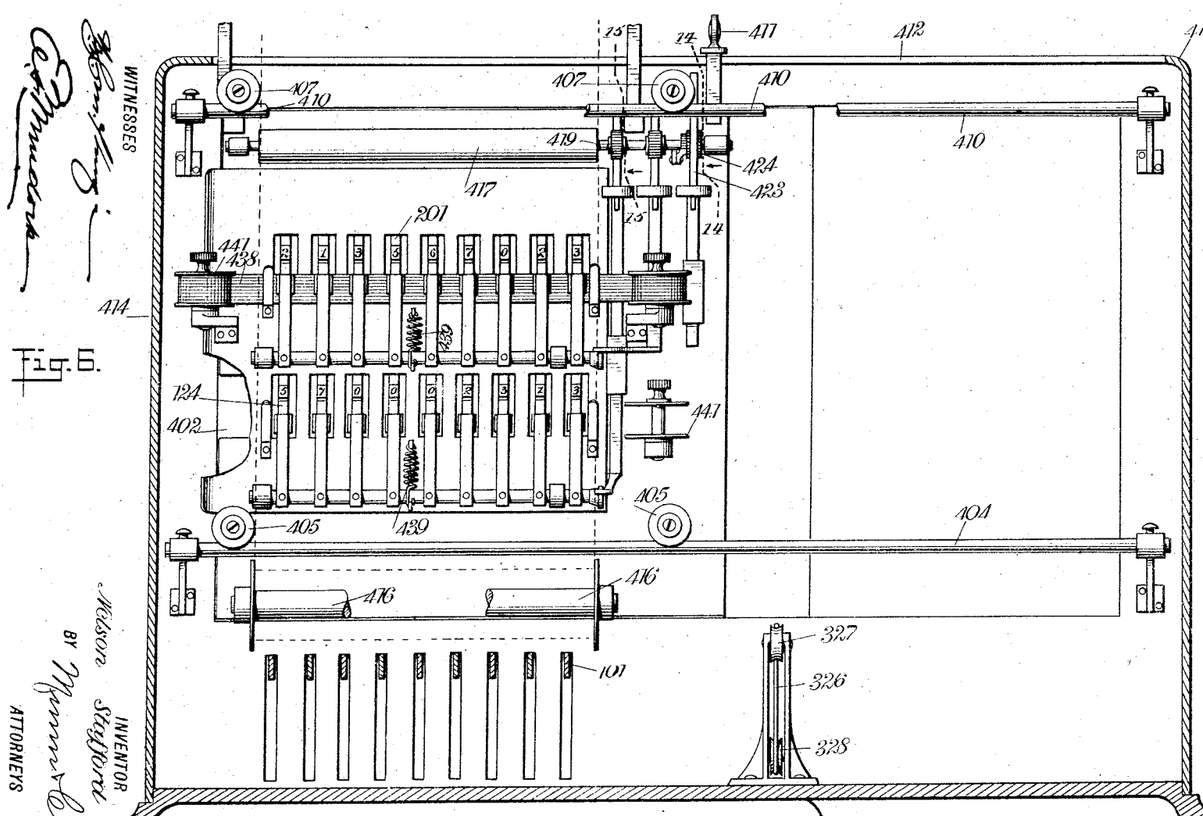
Fig. 6 is a vertical longitudinal section taken on the line 6—6 in Fig. 2.

*The printing mechanism.*—So far in the description no particular attention has been paid to the printing mechanism, although occasional reference has been made thereto. The machine is so designed that the amounts composed or set up on the wheels 124 and 201 may be optically viewed, and when desired may be used for imprinting a record on a sheet or ribbon of paper carried by the machine. The printing mechanism is mounted upon a plate or sliding shield 401. The shield 401 is provided with two slots 402 and 403 disposed lengthwise of the shield and open at one end, as seen best in Fig. 6 of the drawings. The shield 401 is supported on a track 404, the rollers 405 running on the said track. The rollers 405 are rotatively mounted on a stud shaft 406 which is extended from the shield 401. The rollers 407 are rotatively mounted on a stud shaft 409 which is rigidly attached to the shield 401 adjacent the upper edge thereof.

The rollers 407 run on the track 410 which is extended between the ends of brackets 408 provided to support the said track. Rigidly attached to the shield 401 is a handle 411 which is extended through a slot 412 formed in the top of the casing for the adding mechanism. The slot 412, as seen in Fig. 7 of the drawings, is formed in the extension 413 of the casing or frame 414. By grasping the handle 411 the shield 401 and parts connected therewith may be moved to cover the wheels 124 and 201 and operating mechanism therefor, or be placed in the extension 413, thereby exposing the said wheels to view. The wheels are thus exposed to view whenever it is desired by the operator to see what the number set up by the manipulation of the case is, whether the same be in the upper or totalizing wheels or in the lower or adding wheels.

Disposed adjacent the lower edge of the shield 401, and rotatively mounted in the brackets 415, is a paper spool 416. Adjacent the upper edge of the said shield, and preferably in line with the spool 416, is a feed roller 417. The roller 417 is mounted on a shaft 418, which shaft is fixedly provided with the ratchets 419, 419. Each of the ratchets 419 is operated by a spring detent 420, best shown in Fig. 15 of the drawings. The spring detent 420 is provided with a spur 421 adapted to override the teeth of the ratchet 419 when the detent is depressed, and to engage the said ratchet when the said detent is lifted. A detent 420 is mounted on each of the plungers 434 and 436. In this manner is provided automatic feed for the paper passing from the spool 416 upward and out of the machine under the feed roller 417 to operate when either set of wheels is used for printing on the paper.

The paper in passing from the spool 416 to the roller 417 is held under a face plate 426. The face plate 426 is suitably secured to the shield 401, and has rigidly secured thereto the bearings 427 through which are extended the rocking shafts 428. The rocking shafts 428 are similar in that each has mounted rigidly thereon a series of hammers 429, each hammer being provided with a head 430 formed of any suitable material, that preferred by me being rubber.

At the end of each of the shafts 428 is formed a bracket 431 upon which rest the foot extensions 432 and 433. The extension 432 is extended from the end of a plunger 434, at the upper end whereof is mounted a key pad 435 which, as shown in Fig. 1 of the drawings, is extended from the front of the frame 414 and bears the inscription "lower print". The extension 433 is set out from the plunger 436, the upper end whereof is provided with a key pad 437, whereon is the inscription "upper print", as shown in Fig. 1 of the drawings.

The depression by the operator of either of the key pads 435 or 437 ultimates in the rocking of the upper or lower shaft 428 respectively. When the shaft 428 is thus rocked the hammers 429 are withdrawn from the printing ribbons 438, 438 which are stretched across the face of the hammer heads 430. When the keys are released the spiral springs 439 return the shafts 428 to their normal position, violently striking the heads 430 carried on the hammers 429 upon the printing ribbons 438, pressing the same and the paper held between the shield 401 and the face plate 426 against the type set up in compositing order on the sets of wheels 124 and 201. The plate 426 is provided with a series of openings 440 through which may be extended the ribbons 438 when thus struck by the spring actuated hammers. The said openings 440 are in line with the shafts on which the type wheels are mounted. The ribbons 438 are mounted in the spools 441 which may be manually operated by means of the milled heads 442. No automatic feed for the ribbons is disclosed in the present invention, it being unnecessary at the present time to employ such. Any suitable form may hereafter be adopted.

Figure 5:
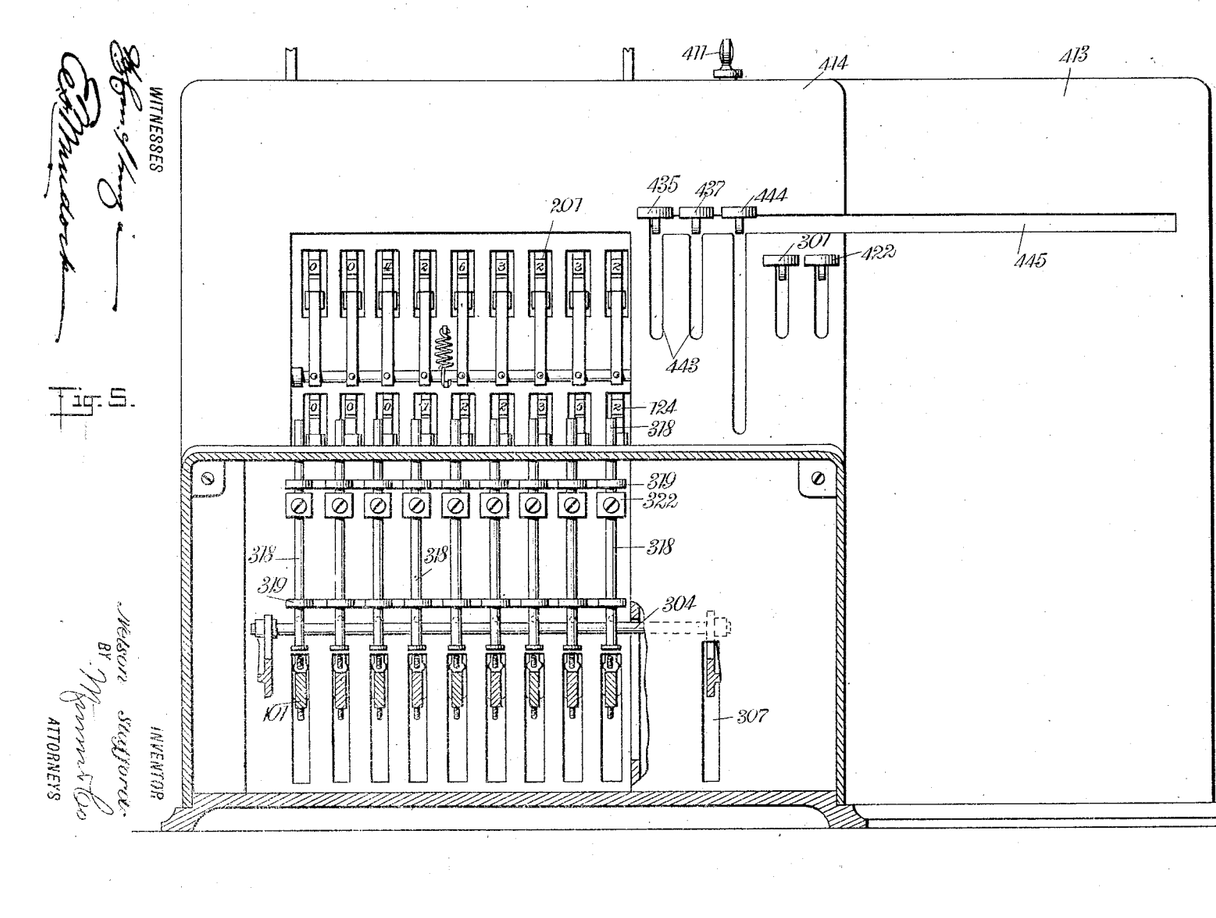
Fig. 5 is a vertical longitudinal section taken on the line 5—5 in Fig. 2.

It will be understood that the printing mechanisms above described are operated only when the shield 401 and plate 426 are disposed in the position shown in Fig. 5 of the drawings. To permit the depression of the key pads 435 and 437 the frame 414 is provided with the slots 443. It will be noted by reference to Fig. 5 that when the shield 401 and plate 426 carried thereby have been moved to one side to expose the top wheels the key pads 435, 437 and 444 are moved into the horizontal slot 445 whereby the manipulation of the said key pads is prevented until the printing mechanism is disposed in alinement with the two sets of adding and totalizing wheels.

Figures 2, 13, 14, 15, 16:
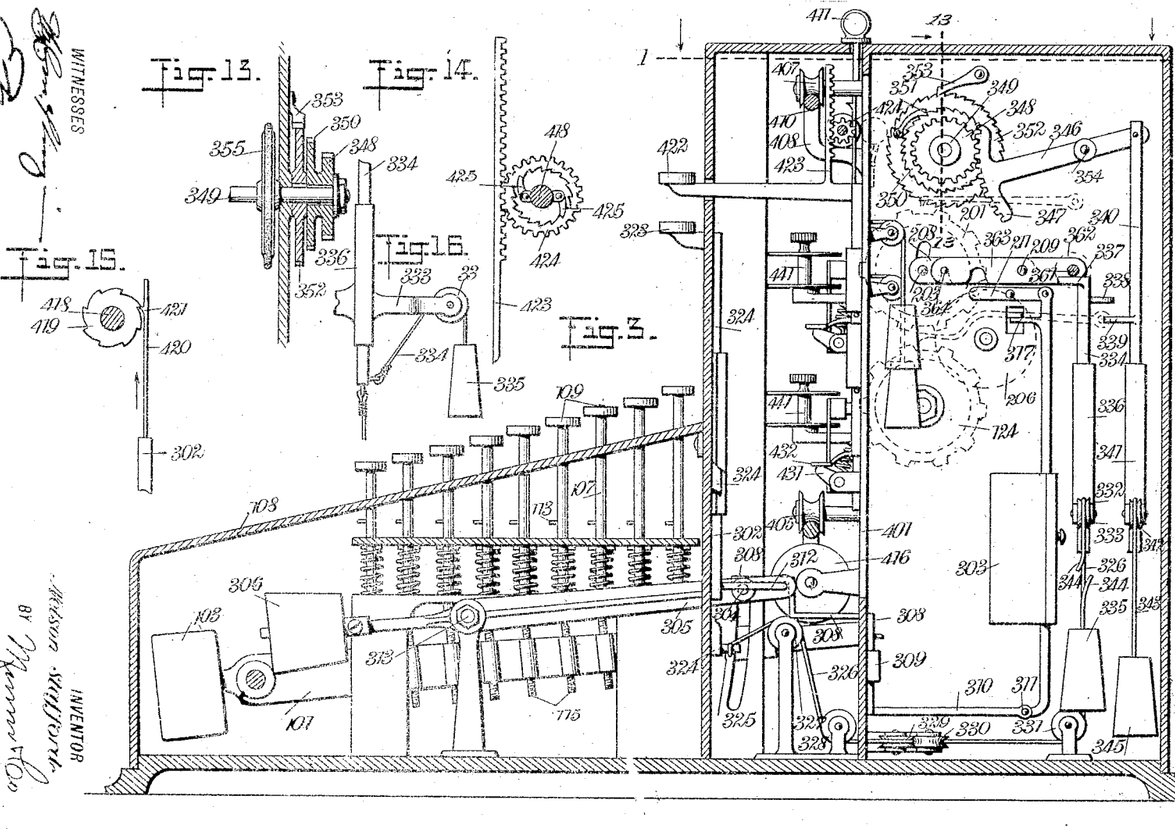
Fig. 13 is a detail view, in vertical section, showing one of the series of friction driving wheels for resetting the type wheels of the totalizing mechanism together with operative mechanism therefor.
Fig. 14 is a detail view, in vertical section, taken on the line 14—14 in Fig. 6, showing a means for manually feeding the tabulating paper.
Fig. 15 is a vertical cross section taken on the line 15—15 in Fig. 6, showing the means for automatically feeding the tabulating paper coincident with the printing of a number.
Fig. 16 is a detail view of the mechanism for returning to normal position the totalizer and adding mechanism.

*The feeding mechanism.*—To adjust the paper irrespective of the operation of the rollers there is provided a key 422 which is provided with a rack bar 423. The rack bar 423, together with the wheel 424 are best seen in Fig. 14 of the drawings. The wheel 424 is loosely mounted on the shaft 418 and is constantly in mesh with the teeth of the rack bar 423. Extended from and pivotally mounted upon the shaft 418 are the pawls 425 which operate by gravity to engage the internal ratchet teeth formed on the wheel 424. In this manner is provided means for alternately engaging and moving the shaft 418 by the wheel 424 which is constantly engaged with the rack bar 423 to rotate in both rotary directions concordantly with the operation of the rack bar 423. By operating the key 422 one or more times, as desired, the operator may rotate the shaft 418 and the feed roller 417 to lift the paper independently of the operation of the adding and totalizing mechanisms.

Having thus described my invention, what I claim as new and desire to secure by Letters Patent is:—

1. A calculating machine having a plurality of adding mechanisms disposed in parallel arrangement; means for operating said adding mechanisms in unison; and a printing mechanism for transferring impressions of the composited characters of said adding mechanisms to a proper medium, said printing mechanism being removable to disclose the adding mechanisms.

2. A calculating machine having a plurality of adding mechanisms the wheels whereof are provided with printing characters; a printing mechanism being disposed in front of said adding mechanisms to imprint the composited characters on a proper medium, said printing mechanism being mounted on a member removable to expose the said compositing characters.

3. In a calculating machine, a calculating mechanism having an adding mechanism, a plurality of key bars each operatively connected with to rotate one of the wheels of said adding mechanism; and means connected with each of said key bars for operating the same to the full limit to complete the rotation of each wheel to present the same in the initial position.

4. A calculating machine having an adding mechanism provided with a series of operatively connected progressively actuated wheels; a plurality of key bars each operatively connected with one of said wheels to rotate the same; a plurality of weighted members each adapted to rest upon one of said key bars to depress the same to the full limit thereof; and means for suspending said weighted members.

5. In a calculating machine of the character set forth, a plurality of operating key bars; a plurality of weight carrying plungers each supported above one of said key bars; a supporting rack for said plungers; and means for depressing said rack to permit said plungers to depress said key bars.

6. In a calculating machine of the character set forth, a plurality of operating key bars; a plurality of weight carrying plungers each supported above one of said key bars; a supporting rack for said plungers; means for depressing said rack to permit said plungers to depress said key bars; and transmission mechanism between each of said key bars and number wheel of a calculating mechanism adapted for the rotation of said wheel in one direction only.

7. In a calculating machine of the character set forth, having two normally connected adding mechanisms; means for lifting one of said adding mechanisms out of engagement with the other of said adding mechanisms; a resetting mechanism for the lifted adding mechanism having a series of friction wheels adapted to engage the wheels of said lifted adding mechanism; and means for rotating said friction wheels to rotate the wheels of said lifted adding mechanism to initial position.

8. In a calculating machine, an adding mechanism having a series of operatively connected and progressively actuated wheels provided on the periphery thereof with numeral characters; a second adding mechanism the wheels whereof are normally operatively connected with the wheels of the first adding mechanism, means for disengaging the wheels of the second adding mechanism from those of the first adding mechanism; means for resetting to initial position the wheels of the first adding mechanism; and a paper feeding and printing mechanism juxtaposed to said adding mechanisms adapted to at will obtain impression from the wheels of either of said adding mechanisms whereby listing and total printings may be effected.

9. In a calculating machine, an adding mechanism having a series of operatively connected and progressively actuated wheels provided on the periphery thereof with numeral characters; a second adding mechanism the wheels whereof are normally operatively connected with the wheels of the first adding mechanisms means for disengaging the wheels of the second adding mechanism from those of the first adding mechanism; means for resetting to initial position the wheels of the first adding mechanism; a paper feeding mechanism to guide paper in juxtaposed relation to the wheels of both said adding mechanisms; a plurality of independently operated printing mechanisms mounted on said paper feeding mechanism to obtain impression from the wheels of each of said adding mechanisms; and a plurality of inking ribbons one disposed opposite the compositing station of each of said adding mechanisms.

10. In a calculating machine, an adding mechanism having a series of operatively connected and progressively actuated wheels provided on the periphery thereof with numeral characters; a second adding mechanism the wheels whereof are normally operatively connected with the wheels of the first adding mechanism; means for disengaging the wheels of the second adding mechanism from those of the first adding mechanism; means for resetting to initial position the wheels of the first adding mechanism; a paper feeding mechanism to guide paper in juxtaposed relation to the wheels of both adding mechanisms; a plurality of independently operated printing mechanisms mounted on said paper feeding mechanism to obtain impression from the wheels of each of said adding mechanisms; a plurality of inking ribbons one disposed opposite the compositing station of each of said adding mechanisms; and a plurality of manually selective actuating mechanisms for said printing mechanisms.

11. In a calculating machine having a plurality of rotary tally members, a plurality of key bars each bar being operatively connected with a tally member to effect the same proportionate to the movement of the connected end of said bar, and said bars being pivoted at a point removed from said tally members; and means for locking each of said key bars to move the said connected end thereof through a series of equally increased arcs.

In testimony whereof I have signed my name to this specification in the presence of two subscribing witnesses.

NELSON STAFFORD.

Witnesses:
E. F. MURDOCK,
JOHN P. DAVIS.

---

Copies of this patent may be obtained for five cents each, by addressing the "Commissioner of Patents, Washington, D. C."